July 15, 1941.     M. A. RAIRIGH     2,249,327
FLY DRESSING APPLIER
Filed June 10, 1940
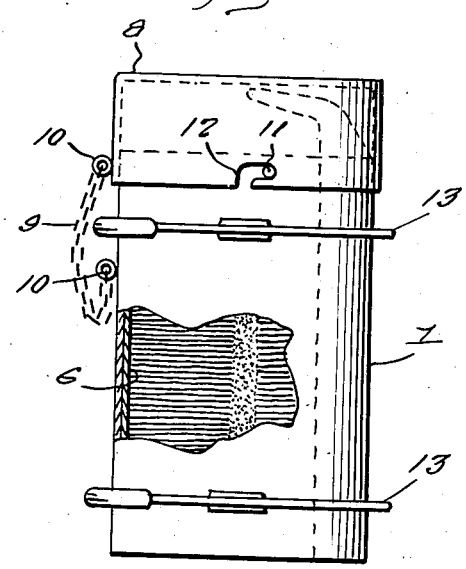
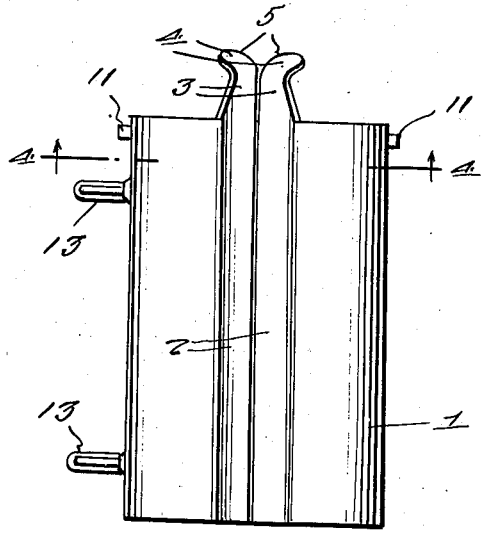
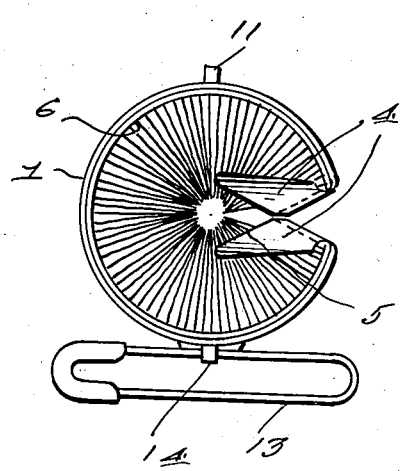
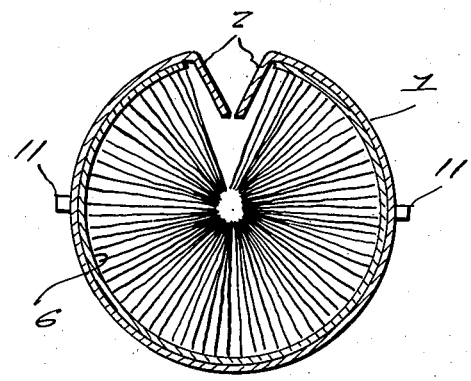
Inventor
Maximillian A. Rairigh
By Clarence A. O'Brien
Attorney Patented July 15, 1941

2,249,327

UNITED STATES PATENT OFFICE 2,249,327

FLY DRESSING APPLIER

Maximillian A. Rairigh, Oil City, Pa.

Application June 10, 1940, Serial No. 339,817

5 Claims. (Cl. 43—4)

My invention relates to improvements in dressing applying devices for use in dressing fishing flies with oil or the like.

The principal object of the invention is to provide an efficient, handy device of inexpensive construction for containing an absorbent brushlike dressing applying medium through which a fishing fly may be pulled, the device being especially designed for drawing the fly through the material in intimate contact therewith and while attached to the leader of a fishing line.

To the accomplishment of the above, and subordinate objects presently appearing, a preferred embodiment of my invention has been illustrated in the accompanying drawing, set forth in detail in the succeeding description, and defined in the claims appended hereto.

In said drawing:

Figure 1 is a view in side elevation of a preferred embodiment of my invention partly broken away and shown in section.

Figure 2 is a similar view with the cap removed and looking at the device from the front side thereof.

Figure 3 is a view in top plan, and

Figure 4 is a view in transverse section taken on the line 4—4 of Figure 2.

Referring to the drawing by numerals, my improved dressing applier, in the illustrated embodiment thereof, comprises an open-ended cylindrical casing 1 of any light-weight semi-flexible metal, and suitable diameter for holding in the hand, and which is longitudinally split and provided with a pair of longitudinally extending edge flanges 2 upon opposite sides of the split, respectively, and converging inwardly of the casing with their free edges spaced slightly apart, as shown in Figure 4. At one end of the casing 1, constituting the top end thereof, the flanges 2 are extended beyond said end for a short distance, as at 3, and provided with flap-like, or antennae-like, terminals 4 extending inwardly of the casing 1 upon opposite sides of the axis of said casing with opposed side edges 5 diverging inwardly of the casing. The flanges 2, as will presently more clearly appear, form a leader guide through which the leader of the fishing line may be introduced into the casing, and the flap-like terminals 4 an entrance to said guide having the form of a snake's tongue as best shown in Figure 3.

The casing 1 is lined with brush-like material 6 such as will absorb oil, or other similar fly dressing, for instance, long fiber felt, long-haired fur, or the like, and with the fiber, or hair, extending inwardly toward the center of the casing and the material suitably secured, as by cement, not shown, to the inner face of the casing, and extending around the same from the flanges 2.

A crown-type cap 8 is provided for closing the top end of the casing 1 and covering the terminals 4 and which may be anchored to the casing 1 by a short chain 9 attached to eyelets 10 on the cap 8 and casing 1, respectively. A pair of laterally extending studs 11 are provided on the casing 1 at diametrically opposite sides thereof, respectively, adjacent its upper end, for entering a pair of bayonet slots 12 provided in the edge of the cap 8, whereby said cap may be retained on the casing in a manner which will be understood.

For detachably securing the casing 1 to the coat, or trousers, a pair of safety pin fasteners 13 are suitably mounted in apertured lugs 14 on the casing 1, said fasteners extending lengthwise across the casing adjacent the top and bottom thereof.

In using the described device, the leader of the fishing line, not shown, is passed through the described guide between the terminals 4 first and then through the remainder of the flanges 2 into the casing 1 and material 6, the fly, not shown, being held by the fingers suitably spaced from the top end of the casing and said terminals 4. After the leader is entered in the manner described, it is pulled through the material to ease the fly through the same. The material 6 may be saturated, or moistened, with dressing oil or other dressing to be applied to the fly, so that as the latter is drawn through the material it will be coated with the dressing which will be brushed thereon in an even thin coat.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claims.

What I claim is:

1. In a device for applying dressing to a fishing fly on a leader, a cylindrical casing open at both ends and longitudinally split along one side for the entrance of the leader into the casing, and a lining in said casing of fibrous material extending around the casing from each side of the split and with the fibers extending inwardly toward the center of the casing to form a brush-like medium through which the leader and fly may be drawn, said lining being adapted to be saturated with fly dressing.

2. In a device for applying dressing to a fishing fly on a leader, a cylindrical casing open at both ends and longitudinally split along one side for the entrance of the leader into the casing, and a lining in said casing of fibrous material extending around the casing from each side of the split and with the fibers extending inwardly toward the center of the casing to form a brush-like medium through which the leader and fly may be drawn, said lining being adapted to be saturated with fly dressing, and a pair of edge flanges on said casing extending longitudinally thereof along opposite sides of the split, respectively, into the casing in converging relation to form a guide for entering the leader into the casing.

3. In a device for applying dressing to a fishing fly on a leader, a cylindrical casing open at both ends and longitudinally split along one side for the entrance of the leader into the casing, and a lining in said casing of fibrous material extending around the casing from each side of the split and with the fibers extending inwardly toward the center of the casing to form a brush-like medium through which the leader and fly may be drawn, said lining being adapted to be saturated with fly dressing, and a pair of edge flanges on said casing extending longitudinally thereof along opposite sides of the split, respectively, into the casing in converging relation to form a guide for entering the leader into the casing, said flanges having a pair of end terminals extending inwardly of one end of the casing over said end and having diverging opposed side edges providing a throat for facilitating entrance of the leader into said guide.

4. In a device for applying dressing to a fishing fly on a leader, a cylindrical casing open at both ends and longitudinally split along one side for the entrance of the leader into the casing, and a lining in said casing of fibrous material extending around the casing from each side of the split and with the fibers extending inwardly toward the center of the casing to form a brush-like medium through which the leader and fly may be drawn, said lining being adapted to be saturated with fly dressing, and a pair of edge flanges on said casing extending longitudinally thereof along opposite sides of the split, respectively, into the casing in converging relation to form a guide for entering the leader into the casing, said flanges being resilient for relative separation to permit passage of the leader between the same.

5. In a device for applying dressing to a fishing fly on a leader, a cylindrical casing open at both ends and longitudinally split along one side for the entrance of the leader into the casing, and a lining in said casing of fibrous material extending around the casing from each side of the split and with the fibers extending inwardly toward the center of the casing to form a brush-like medium through which the leader and fly may be drawn, said lining being adapted to be saturated with fly dressing, and a pair of edge flanges on said casing extending longitudinally thereof along opposite sides of the split, respectively, into the casing in converging relation to form a guide for entering the leader into the casing, said flanges having a pair of end terminals extending inwardly of one end of the casing over said end and having diverging opposed side edges providing a throat for facilitating entrance of the leader into said guide, and a closure cap for said end of the casing.

MAXIMILLIAN A. RAIRIGH.